(12) United States Patent
Wang et al.

(10) Patent No.: US 12,250,093 B2
(45) Date of Patent: Mar. 11, 2025

(54) METHOD FOR IMPLEMENTING REAL-TIME SOFT BUS ORIENTED TO INTELLIGENT RAIL TRANSIT SYSTEM

(71) Applicant: CASCO SIGNAL CO., LTD., Shanghai (CN)

(72) Inventors: Chen Wang, Shanghai (CN); Yufei Peng, Shanghai (CN); Xulan He, Shanghai (CN); Xuezong Liu, Shanghai (CN); Guangxu Zhao, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 0 days.

(21) Appl. No.: 17/793,200

(22) PCT Filed: Oct. 13, 2021

(86) PCT No.: PCT/CN2021/123472
§ 371 (c)(1),
(2) Date: Jul. 15, 2022

(87) PCT Pub. No.: WO2022/227414
PCT Pub. Date: Nov. 3, 2022

(65) Prior Publication Data
US 2024/0179024 A1     May 30, 2024

(30) Foreign Application Priority Data
Apr. 28, 2021   (CN) .................. 202110465672.X

(51) Int. Cl.
*H04B 7/185*     (2006.01)
*H04L 12/18*     (2006.01)
*H04L 12/40*     (2006.01)

(52) U.S. Cl.
CPC .... *H04L 12/40169* (2013.01); *H04L 12/1859* (2013.01); *H04L 2012/40273* (2013.01)

(58) Field of Classification Search
CPC ...................... H04L 12/1859; H04L 12/40169
See application file for complete search history.

(56) References Cited

U.S. PATENT DOCUMENTS

| 8,543,484 B2 * | 9/2013 | Reuter .................. G06Q 40/04 705/37 |
| 10,917,263 B1 * | 2/2021 | Sheehan ................ H04L 41/40 |

(Continued)

FOREIGN PATENT DOCUMENTS

| CN | 106452841 A | 2/2017 |
| CN | 110104033 A | 8/2019 |

(Continued)

OTHER PUBLICATIONS

International Search Report dated Jan. 25, 2022 issued in PCT International Application No. PCT/CN2021/123472, 5 pages (in Chinese).

(Continued)

*Primary Examiner* — Abdelnabi O Musa
(74) *Attorney, Agent, or Firm* — Amster Rothstein & Ebenstein LLP

(57) ABSTRACT

A method for implementing a real-time soft bus oriented to an intelligent rail transit system includes: defining a data type for interaction between a server and a communication front-end processor, where the defined data type is a message structure body which includes a message header and a message body; enabling professional subsystems to construct at least one publisher entity and/or at least one subscriber entity, respectively, where the data type of the communication between the publisher entity and the subscriber entity corresponding thereto is a message structure body. The subsystems choose to subscribe to the data of its interest, or to publish the data that it can provide.

7 Claims, 3 Drawing Sheets

(56) References Cited

U.S. PATENT DOCUMENTS

| | | | | |
|---|---|---|---|---|
| 2004/0024824 | A1* | 2/2004 | Ferguson | H04L 51/214 |
| | | | | 709/206 |
| 2006/0067209 | A1* | 3/2006 | Sheehan | H04L 41/22 |
| | | | | 370/216 |
| 2019/0013930 | A1* | 1/2019 | Munir | H04L 9/0631 |
| 2019/0145861 | A1 | 5/2019 | Persson et al. | |
| 2020/0128029 | A1* | 4/2020 | Nishimura | H04L 63/18 |
| 2023/0345074 | A1* | 10/2023 | Wang | G09B 5/06 |
| 2024/0028695 | A1* | 1/2024 | Chen | H04L 67/1095 |

FOREIGN PATENT DOCUMENTS

| | | | | |
|---|---|---|---|---|
| CN | 110266783 | A | | 9/2019 |
| CN | 111913387 | A | | 11/2020 |
| CN | 113098747 | A | | 7/2021 |
| EP | 3771615 | A1 | * | 2/2021 ......... B61L 15/0072 |
| WO | WO-2020013761 | A1 | * | 1/2020 |

OTHER PUBLICATIONS

Written Opinion dated Jan. 25, 2022 issued in PCT International Application No. PCT/CN2021/123472, 5 pages (in Chinese).
China National Intellectual Property Administration, Search Report for China Patent Application No. 202110465672.X, Dec. 28, 2021, 2 pp., China.

\* cited by examiner

METHOD FOR IMPLEMENTING REAL-TIME SOFT BUS ORIENTED TO INTELLIGENT RAIL TRANSIT SYSTEM

CROSS-REFERENCE TO RELATED APPLICATIONS

This application is a U.S. national stage entry under 35 U.S.C. § 371 of PCT International Patent Application No. PCT/CN2021/123472, filed Oct. 13, 2021, which claims priority to Chinese Patent Application No. 202110465672.X, filed Apr. 28, 2021, the contents of each of which are incorporated herein by reference in their entirety.

FIELD OF TECHNOLOGY

The present invention relates to the field of an intelligent rail transit, in particular to a method for implementing a real-time soft bus oriented to an intelligent rail transit system.

BACKGROUND

The intelligent rail transit system is an integrated monitoring system of the rail transit with driving as the core, which guarantees the rail transit driving safety. The system is large in scale and involves many professional subsystems. How to make these professional subsystems operate in coordination with each other without interfering with each other is one of the key problems to be resolved in the intelligent rail transit system.

The professional subsystems include an automatic train monitoring system (ATS), a public-address system (PA), a passenger information system (PIS), a closed circuit television (CCTV), a building automation system (BAS), an automatic fare collection system (AFC) and a fire alarm system (FAS), and the like. There are many data types of communication between the professional subsystems, and the amount of data is huge. The traditional tcp point-to-point communication method makes the network topology in the entire system complex, which is not conducive to the development and maintenance of the system. Therefore, the traditional tcp point-to-point communication method can no longer meet the requirements of the intelligent rail transit system for high reliability, high efficiency and low maintenances costs.

With the increase in the scale of rail transit lines, the traditional distributed soft bus meets the communication requirements of the system by mainly adding functions. Under this communication mode, the real time, reliability and flexibility of communication between the subsystems greatly restrict the overall performance and scale of the system, and therefore a new soft bus communication form is urgently needed to adapt to this mode.

The intelligent rail transit system is an integrated monitoring system of the rail transit with driving as the core, and a distributed integrated monitoring system with the control center-station structure as the core. Taking the intelligent dispatching subsystem as an example, the system is centered on the ATS system with traffic monitoring function, and is integrated with power monitoring, the FAS/BAS, the CCTV, the platform doors, and the AFC to achieve inter-professional linkage. In this subsystem, a plurality of servers are deployed in the control center and stations respectively, and each professional subsystem is connected through the control center and each station respectively. As the scale of the system continues to increase, the data types and quantities in communication between the server and the communication front-end processor (FEP) increase, and the structure of the network communication also becomes increasingly complex.

SUMMARY

An objective of the present invention is to overcome the foregoing defect in the related art and provide a method for implementing a real-time soft bus oriented to an intelligent rail transit system. In the method, distributed real-time communication middleware is designed to change the complex mode of communication between the subsystems of the intelligent rail transit system. The middleware, based on a technical specification design of a data distribution service, uses a publish/subscribe system architecture and a udp (user datagram protocol) transmission protocol and shared memory communication, can ensure real-time, efficient and flexible data transmission, and can meet the application requirements of distributed real-time communication of the intelligent rail transit.

To achieve the foregoing objective, the present invention uses the following technical solutions.

A method for implementing a real-time soft bus oriented to an intelligent rail transit system includes:
  defining a data type for interaction between servers and communication FEPs, where the defined data type is a message structure body, and the message structure body includes a message header and a message body: and
  enabling professional subsystems to construct at least one publisher entity and/or at least one subscriber entity respectively, where the data type of the communication between the publisher entity and the subscriber entity corresponding thereto is a message structure body.

Optionally, structure information of the message header includes an interface version number, a message sending time, a data check code, source address information, destination address information, and/or a message type.

Optionally, the source address information and/or the destination address information include a domain number where the communication FEP is located and/or a serial number of the communication FEP.

Optionally, the enabling professional subsystems to construct at least one publisher entity and/or at least one subscriber entity respectively specifically includes:
  registering entity information to the soft bus when a publisher entity or a subscriber entity is created on a node of the soft bus: publishing the entity information by the soft bus, and enabling other nodes of the soft bus to perform parameter match after the entity information is received, recording the entity information by the soft bus and returning match information to the corresponding nodes only after match rules are met.

Optionally, data isolation of the soft bus is achieved via domains, a domain number needs to be specified when a publisher entity or a subscriber entity is created on a node of the soft bus, and a multicast port is calculated by the soft bus according to the domain number.

Optionally, at least one partition is respectively arranged in the publisher entity and the subscriber entity, and the publisher entity and the subscriber entity can communicate with each other only when the partition of the publisher entity has an intersection with the partition of the subscriber entity.

Optionally, the publisher entity and the subscriber entity are respectively associated with at least one subject, data is published by the publisher entity via an associated subject thereof, data of interest is acquired by the subscriber entity via an associated subject thereof.

Optionally, the enabling professional subsystems to construct at least one publisher entity and/or at least one subscriber entity respectively further specifically includes:

creating a transmission plug-in, which is configured to define a transmission mode of data communication, and the transmission mode is specifically as follows:

if a publisher entity and a subscriber entity corresponding to the publisher entity are on a same host, the two entities communicate data by sharing a memory:

and if a publisher entity and a subscriber entity corresponding to the publisher entity are on different hosts, the two entities communicate data by udp unicast or multicast.

Optionally, the enabling professional subsystems to construct at least one publisher entity and/or at least one subscriber entity respectively further specifically includes:

creating a data cache unit, which is configured to cache a data queue for data publication and a data queue for subscription.

Optionally, the enabling professional subsystems to construct at least one publisher entity and/or at least one subscriber entity respectively further specifically includes:

creating a thread pool container, which is configured as a management container of a publisher entity and a subscriber entity, and a management method of the management container specifically is specifically as follows:

when there are a publisher entity and a subscriber entity that are matched, the thread pool container is responsible for creating, using and querying the publisher entity and the subscriber entity that are matched; and when the publisher entity and the subscriber entity that are matched are disconnected, the thread pool container is responsible for destroying and recycling the publisher entity and the subscriber entity that are unmatched.

Optionally, the method further includes:

defining a Qos (quality of service) service, by which any behavior of an object contained in the publisher entity and the subscriber entity is determined.

Optionally, the Qos services include a reliability service and a persistence service.

Optionally, the reliability service specifically includes the following three forms:

a strictly reliable form: when the Qos of the soft bus is configured in the strictly reliable form, each packet of data sent by the publisher entity is reliably and orderly transmitted to the subscriber entity by the soft bus after the matching of the publisher entity and the subscriber entity is completed:

a last N packet data reliable form: when the Qos of the soft bus is configured in the last N packet data reliable form, only the last N packet data published by the publisher entity is concerned by the subscriber entity, and it is only ensured by the soft bus that the last N packet data of the publisher entity is reliably and orderly received by the subscriber entity, where N is a positive integer;

a best effort form: when the Qos of the soft bus is configured in the best effort form, and it is only ensured by the soft bus that data published by the publisher entity is orderly transmitted to the subscriber entity, but it is not ensured that all data is delivered in entirety.

Optionally, the persistence service specifically includes:

when data is published by a publisher entity, a subscriber entity corresponding thereto may not be online, and the published historical data is missed when the subscriber entity goes online: when the Qos of the soft bus is configured to be persistent, the data of the publisher entity is stored in a memory or a hard disk by the soft bus, and when the publisher entity is matched with a new subscriber entity, the stored historical data is actively sent by the soft bus to the new subscriber entity.

In addition, the present invention further discloses a real-time soft bus, where the soft bus is implemented by the method for implementing a real-time soft bus oriented to an intelligent rail transit system. The soft bus specifically includes a soft bus resource interface, a Qos module, a soft bus event driving module and a shared memory, where the soft bus resource interface includes a transmission plug-in interface, a thread pool container, a data cache unit and an entity creation interface.

Compared with the prior art, the present invention has at least one of the following advantages.

1) The publish-subscribe model used by the soft bus can realize efficient data distribution of each subsystem component across processes, across regions and across platforms. Under the mode, data is spatially isolated, and it is only necessary for the subsystems to choose to subscribe the data of its interest, or to publish the data that it can provide.

2) The communication between the publisher entity and the subscriber entity corresponding thereto is completely completed by the soft bus and there is no need to concern the address and quantity of the other between them, thereby achieving spatial decoupling.

3) The publisher entity or subscriber entity is asynchronous with the soft bus. The publisher entity only needs to write data to the soft bus, while the subscriber entity receives data trigger events only when data arrives, to eliminate interdependence between communication entities, reduce bandwidth delay, and realize data flow decoupling.

4) Based on the design of QoS service levels, the priority can be set for different business data according to the importance of the business, and the data with a higher priority can be preferentially transmitted by the network.

5) Based on the unowned design of the publish-subscribe model, the single-point system failure can be effectively eliminated.

DETAILED DESCRIPTION OF THE EMBODIMENTS

A method for implementing a real-time soft bus oriented to an intelligent rail transit system provided by the present invention is further described below in detail with reference to the accompanying drawings and specific implementations. The advantages and features of the present invention become clearer according to the following description. It should be noted that the accompanying drawings are in a simplified form and in inaccurate scales, and are only used to conveniently and clearly describe the implementations of the present invention. To make the objective, features, and advantages of the present invention more comprehensible, refer to the accompanying drawings. It should be known that the structures, ratios, sizes and the like shown in the accompanying drawings of this specification are merely intended to match the content disclosed herein for the understanding and reading of those skilled in the art. They are not intended to limit the implementation conditions of the present invention, so they have no technical significance. Any modification to the structure, change in the proportional relationship or adjustment in the size should still fall within the scope of the technical content disclosed in the present invention without affecting the effects and objectives that can be achieved by the present invention.

Figure 1:
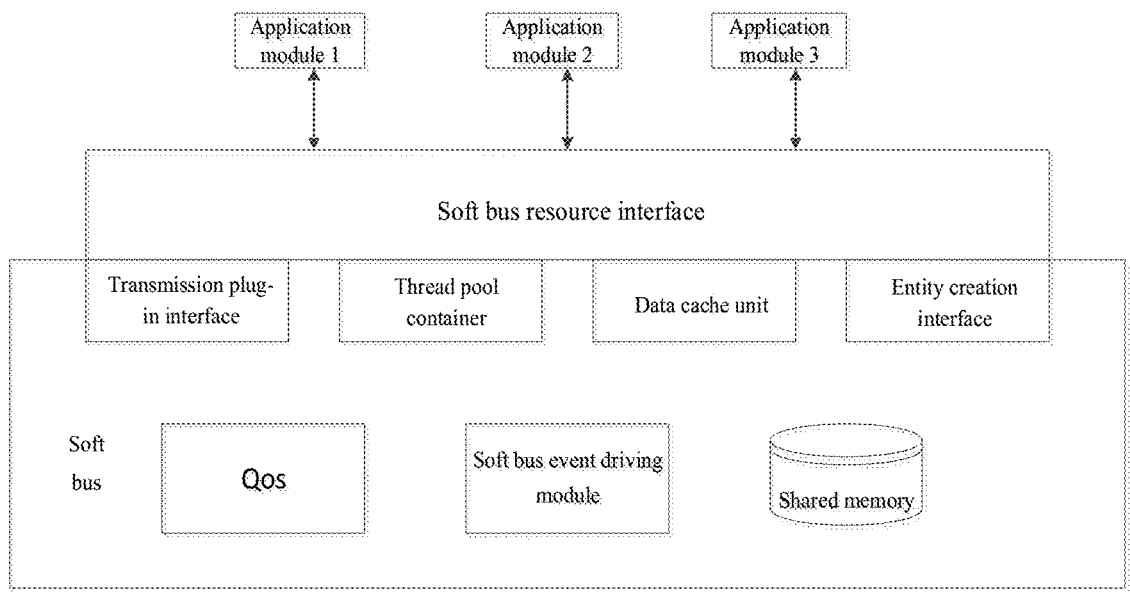
FIG. 1 is a schematic structural diagram of a real-time soft bus oriented to an intelligent rail transit system according to an embodiment of the present invention.

FIG. 1 is a schematic structural diagram of a real-time soft bus oriented to an intelligent rail transit system in this embodiment. The soft bus specifically includes a soft bus resource interface, a QoS module, a soft bus event driving module and a shared memory. The application modules located in the control center or stations access the soft bus through soft bus resource interfaces. The soft bus resource interface includes a transmission plug-in interface, a thread pool container, a data cache unit and an entity creation interface.

The intelligent rail transit system includes at least one professional subsystem. The professional subsystems specifically include an ATS, a PA, a PIS, a CCTV, a BAS, an AFC and a FAS, and the like. Each professional subsystem accesses the soft bus through at least one control center and/or at least one station for data interaction.

Specifically, the station accesses the soft bus through its communication FEP, to interact with the servers of the stations. The control center accesses the soft bus through its communication FEP, to interact with the server of the control center.

It should be noted that the communication FEP of each station and the FEP of each control center access different nodes of the soft bus, and the communication FEP of one station/control center corresponds to one node of the soft bus.

This embodiment provides a method for implementing a real-time soft bus oriented to an intelligent rail transit system, including:

S1: Defining a data type for interaction between servers and communication FEPs, where the data type is also the data type for interaction between various professional subsystems, the defined data type is a message structure body, and the message structure body includes a message header and a message body.

S2: Enabling applications of the professional subsystems to construct at least one publisher entity and/or at least one subscriber entity respectively on the soft bus, where the publisher entity can communicate with its corresponding subscriber entity, and the message structure body is a most basic data transmission unit between the publisher entity and its corresponding subscriber entity.

S3: Defining a Qos service provided by the soft bus, by which any behavior of an object contained in the publisher entity and the subscriber entity is determined.

In this embodiment, the message structure body is defined by using a PROTOBUF structure.

In this embodiment, structure information of the message header includes an interface version number, a message sending time, a data check code, source address information, destination address information, and/or a message type.

In this embodiment, the source address information and/or the destination address information include a domain number where the communication FEP is located and/or a serial number of the communication FEP.

Figure 2:
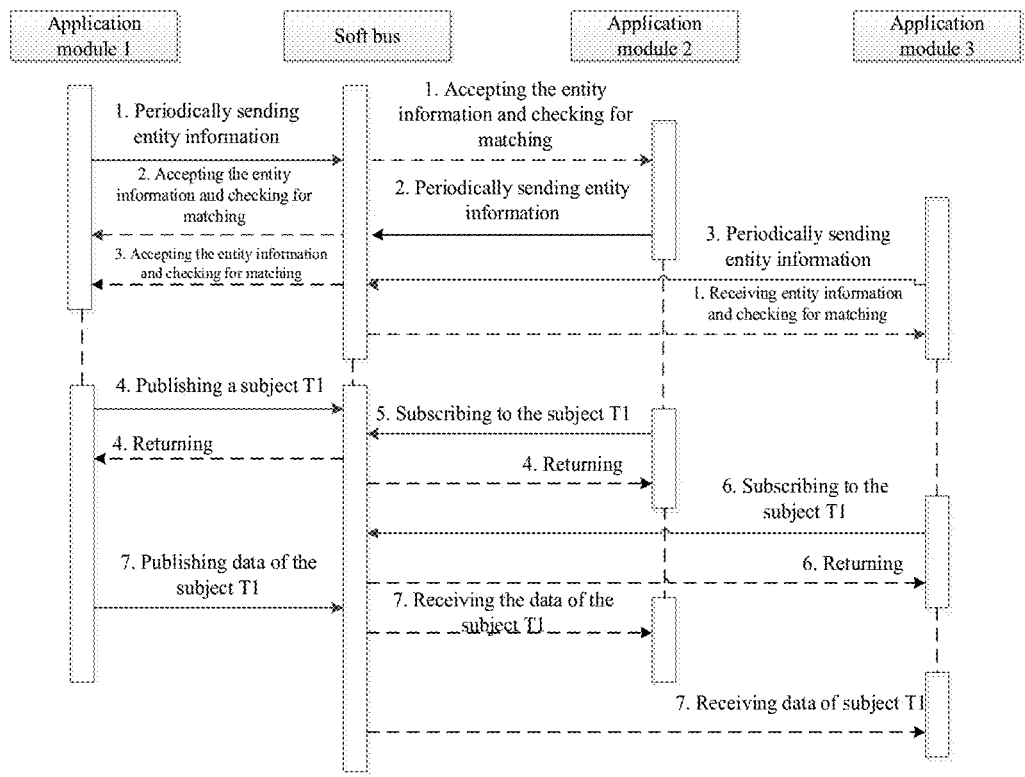
FIG. 2 is a schematic diagram of a data transmission of the soft bus according to an embodiment of the present invention.

FIG. 2 is a schematic diagram of a data transmission of the soft bus in this embodiment. Step S2 specifically includes:

S201: Registering, by the applications of the professional subsystems, entity information to the soft bus when a publisher entity and/or a subscriber entity are/is created on a node of the soft bus: publishing the entity information by the soft bus through broadcasting or sharing a memory, and enabling other nodes of the soft bus to perform parameter match after the entity information is received, recording the entity information by the soft bus and returning, only after match rules are met, match information to the node on which the publisher entity is created. The publisher entity and its corresponding subscriber entity communicate data through the soft bus, and the application program completes the data transmission or reception between the professional subsystems by using the created entities. For example, if a publisher entity created on a node 1 of the soft bus matches subscribers created on a node 2 and a node 3 of the soft bus, the node 2 and the node 3 both receive the data sent by the node 1.

In this embodiment, the identity authentication in the parameter matching process is performed by using the TSL protocol.

In this embodiment, data isolation of the soft bus is achieved via domains, a domain number needs to be specified when a publisher entity and/or a subscriber entity are/is created on a node of the soft bus. The soft bus calculates a unicast or multicast port based on the domain number. After the port is determined, each node can send and receive data on the designated port. The publisher entity and the subscriber entity can communicate only when they are in the same domain, otherwise, they are isolated.

Figure 4:
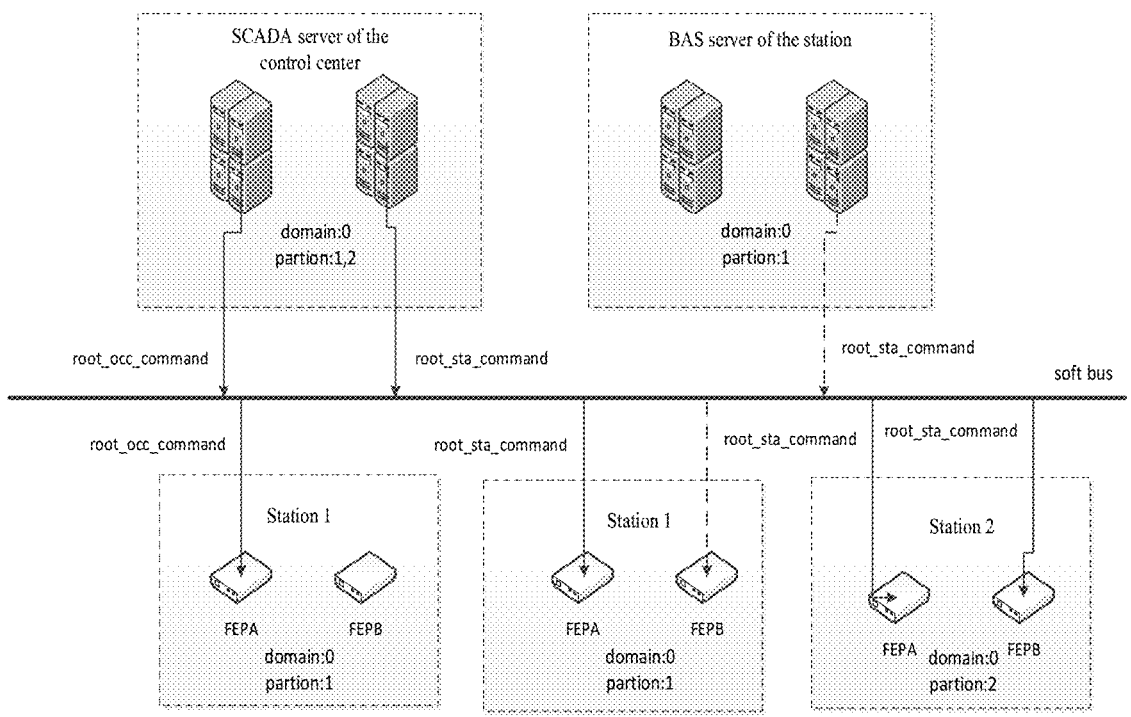
FIG. 4 is a schematic diagram of using the soft bus according to an embodiment of the present disclosure.

FIG. 4 is a schematic structural diagram of the soft bus during the usage in this embodiment. The server of the control center, the communication FEC of the control center, and the server and communication FEC of the station are in the same domain and have the same domain number, that is, the domain number=0.

The xxx_group_id field of the source address information or destination address information in the message structure body indicates a specific station number. A partition number is a serial number of a station or control center and is used to distinguish the control centers and different stations. The partition number is used for the soft bus to isolate stations. In FIG. 4, the field after the partition colon is the partition number of the station or control center. The publisher entity and the subscriber entity are both associated with at least one subject. The publisher entity publishes data through its subject, and the subscriber obtains a subject of interest through its subject. The subjects are distinguished by using fields xxx_occ_xxx and XXX_sta_xxx. The introduction of the subjects makes the application no longer concern the underlying complex network-data interaction process.

It should be noted that a partition number and a partition set for the publisher entity/subscriber entity may be same or different. For example, if there are a control center 1, a station 1 (its station number is 1), a station 2 (its station number is 2), and a station 3 (its station number is 3), the control center 1 needs to communicate with the stations 1, 2, and 3 respectively, and the stations do not need to communicate with each other, three partitions, namely, a partition 1, a partition 2, and a partition 3 may be set for the control center 1, and partition numbers of the stations 1, 2, and 3 may be set to 1, 2, and 3, respectively. In another example, if the partition numbers of the stations 1, 2, and 3 are set to 16, 31, and 49, respectively, the control center 1 can communicate with the stations only by including the three partition numbers.

Whether the partition number and the partition are the same is not limited in this embodiment. Description is made only by using the example that the partition number and the partition are the same.

The publisher entity/subscriber entity on each node of the soft bus sends and receives data through different designated ports at different stages such as before and after matching.

Specifically, a domain number is set to d ($0 \leq d \leq 200$). When the publisher entity and the subscriber entity match for communication, the multicast port is calculated in the following formula:

$$\text{port } 1 = 7720 + d \times 250.$$

After the matching, the subscriber entity specifies the unicast or multicast port during the data communication. When the publisher entity and the subscriber entity communicate data, the unicast port is calculated in the following formula:

$$\text{port } 2 = 7720 + d \times 250 + \text{hostId} \times 2,$$ where the hostId is a serial number of the communication FEP where the subscriber entity is located.

When the publisher entity and the subscriber entity communicate data, the multicast port is calculated in the following formula:

$$\text{port } 3 = 7720 + d \times 250 + 1.$$

The unicast is a one-to-one communication. The data sent by the sender entity is received by only one receiver entity, and the data reception and transmission are performed only between two nodes. When a plurality of nodes need to receive data, the sending node needs to send a piece of data to each receiving node, with a lower efficiency. The multicast is a one-to-one set communication. Nodes that join this set can receive all data in this set. When a plurality of receiving nodes need to receive data, the sending node can transmit the data to all target nodes once, with a higher efficiency.

After created successfully, the publisher entity or subscriber entity sends its own entity information by default in 5 seconds as a cycle, and the information includes a universal unique identifier (uuid), an ip address, a port number, and Qos information. When a local publisher entity or subscriber entity receives information sent by a remote sender entity or subscriber entity, if the domain numbers, partitions, and subject information match through comparison, the matched entities are stored in a local database. The default time-to-live interval set for the publisher entity or subscriber entity is 10 seconds. If the information of the remote entity is not received continuously within this interval, the entities are considered to mismatch with the remote entity and are deleted from the database. The time-to-live interval must be set to be greater than the interval at which the entity information is sent periodically.

It should be noted that this embodiment does not specifically limit the sending period of the information and the time-to-live interval of the publisher entity/subscriber entity, provided that the sending period of the entity information is greater than the time-to-live interval. Description is made only by using an example in which the sending period of the entity information is 5 seconds, and the time-to-live interval is 10 seconds in this embodiment.

Figure 3:
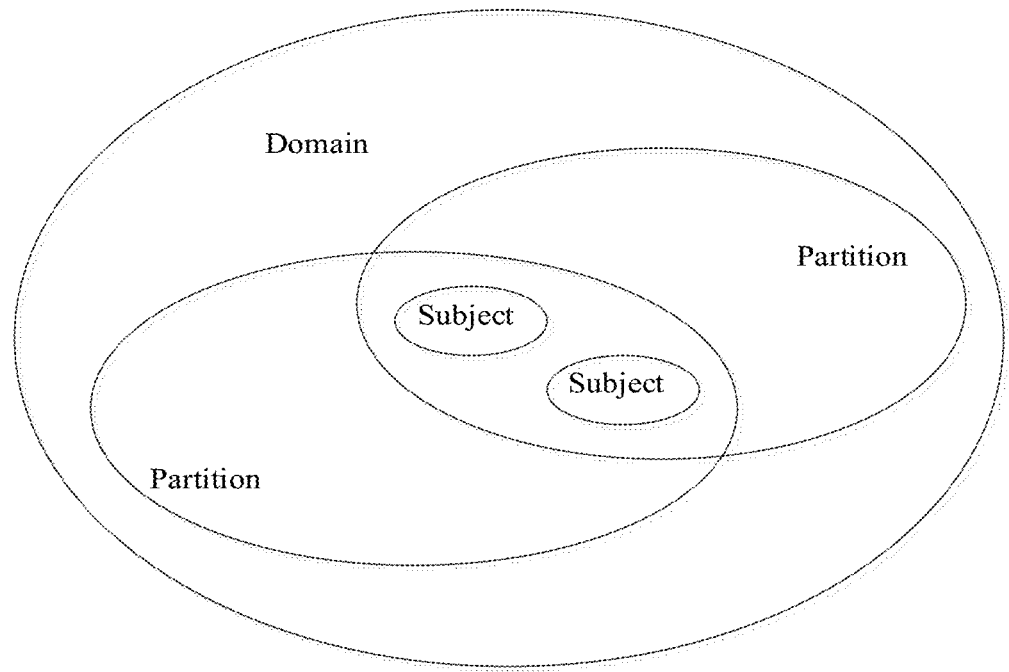
FIG. 3 is a schematic structural diagram of publish-subscribe matching according to an embodiment of the present invention.

In this embodiment, as shown in FIG. 3, the publisher entity and the subscriber entity are respectively provided with at least one partition. The publisher entity and the subscriber entity in the same domain can communicate with each other only when their partitions intersect, which realizes dynamic regional isolation between the publisher entity and the subscriber entity.

In this embodiment, the publisher entity and the subscriber entity are respectively associated with at least one subject. The publisher entity publishes data through its associated top. The subscriber entity obtains data of interest through its associated subject. The introduction of the subjects makes the application no longer concern the underlying complex network-data communication process.

In this embodiment, the soft bus further performs a message content filtering function. When subscribing to data, the subscriber entity may set subscription conditions based on the data content. These subscription conditions are sent to the publisher entity in the process of matching parameters. When publishing data, the publisher entity only send data that meets the subscription conditions to the subscriber entity.

In this embodiment, the content filtering function is performed by using the destination address information in the message structure body as the subscription condition of the subscriber entity. The subscriber entity only receives the message published by the publisher entity that the destination address information includes its domain number and the serial number of the communication FEP. As shown in FIG. 4, when the server of the control center sends a control command to the FEPA of the station 1, the destination address information field dest_group_id needs to be filled with 1, and dest_host_id needs to be filled with the serial number of the communication FEPA, and the subject root_sta_command is used to send data, so that the FEPA of the station 1, by using the message content filtering function of the soft bus, accurately receives the command sent by the control center.

In this embodiment, step S2 further specifically includes:

S202: Creating a transmission plug-in, which is configured to define a transmission mode of data communication, and the transmission mode is specifically as follows:

if a publisher entity and a subscriber entity corresponding to the publisher entity are on a same host (a same machine), the two entities communicate data by sharing a memory and also have a same partition. It should be noted that a publisher entity is enabled to communicate with a subscriber entity corresponding to the publisher entity on a same host via a network, provided that under the case that the two are on the same host by default, the two communicate data by sharing a memory.

If a publisher entity and a subscriber entity corresponding to the publisher entity are on different hosts, the two entities communicate data by udp unicast or multicast. If the unicast or multicast port between the publisher entity and the subscriber entity is occupied, an error prompt is required to inform the user to adjust the settings of the domain number or host number.

When a plurality of applications subscribe to the same subject, to minimize network packets, the publisher entity may send data in the form of multicast, and the subscriber entity sets the multicast address to balance the load. As shown in FIG. 4, the server of the control center may send a command to a communication FEPA and a communication FEPB of the station 2 in the form of multicast. This method is suitable for use when the server needs to send the same control command to all FEPs in a station. Under the condition of filtering content, the destination address field dest_group_id in the data structure sent by the server needs to be filled as the number of the station, and the dest_host_id filled with 0 means all hosts.

In this embodiment, step S2 further specifically includes:

S203: Creating a data cache unit, which is configured to cache a data queue of data published by the publisher entity and a data queue of data published the subscriber entity.

The data cache unit stores data information and heartbeat information. When the QoS service is configured as a reliability service, the publisher entity numbers each packet of data sent, and then sends heartbeat information numbered N, after sending the Nth packet of data, to query whether the subscriber entity has received the N packets of data. If the subscriber entity replies with acknowledgement (ACK) information numbered N, it is indicated that the N packets of data are all received.

If an N-2th (N>2) packet of data of the publisher entity is not received, the subscriber entity replies with negative acknowledgment (NACK) information for the number, and notifies the publisher entity that the N-2th (N>2) packet of data is not received. Then, the publisher entity resends the data packet numbered N-2 (N>2) until it receives the ACK information numbered N, where N=1 by default.

The heartbeat information used by the publisher entity is used not only to repair lost packets, but also to prevent network congestion. When the publisher's cache queues are full, the network is blocked, and after receiving the data, the subscriber entity responds with ACK or NACK, thereby unblocking the network and controlling the flow.

In this embodiment, step S2 further specifically includes:

S204: Creating a thread pool container, which is configured as a management container of a publisher entity and a subscriber entity, and a management method of the management container is specifically as follows:

when there are a publisher entity and a subscriber entity that are matched, the thread pool container is responsible for creating, using and querying the publisher entity and the subscriber entity that are matched: and when the publisher entity and the subscriber entity that are matched are disconnected, the thread pool container is responsible for destroying and recycling the publisher entity and the subscriber entity that are unmatched.

The thread pool containers are classified into an operating thread pool container and a standby thread pool container. When a publisher entity and a subscriber entity that are matched newly need to communicate data, the thread in the standby thread pool container is used in the operating thread pool container. When the matching is disconnected, the thread is released and recycled into the standby thread pool container.

In this embodiment, each publisher entity or subscriber entity (for ease of description, hereinafter referred to as "entity") includes a listener, which triggers an event when the state of the entity changes. A state callback function is used to respond different soft bus events, which specifically include:

a matching event, where when an entity matches a remote entity, a listener of the entity triggers a matching event, and information of the matched remote entity such as an entity name, an application process number, and an address is recorded by using the state callback function;

a disconnection event, where when an entity is disconnected from a remote entity, a listener of the entity triggers a disconnection event, and information of the disconnected remote entity such as the entity name and disconnection time is recorded by using the state callback function; and a data reception event, where when the subscriber entity receives data, a listener of an entity triggers a data reception event, and information of the received structure is recorded by using the state callback function.

In this embodiment, the Qos services include a reliability service and a persistence service. The QoS service allows an application to perform management, set priorities and restrict the data flow in the network.

In this embodiment, the reliability service specifically includes the following three forms:

a strictly reliable form: when the Qos of the soft bus is configured in the strictly reliable form, each packet of data sent by the publisher entity is reliably and orderly transmitted to the subscriber entity by the soft bus after the matching of the publisher entity and the subscriber entity is completed;

a last N packet data reliable form: when the Qos of the soft bus is configured in the last N packet data reliable form, only the last N packet data published by the publisher entity is concerned by the subscriber entity, it is only ensured by the soft bus that the last N packet data of the publisher entity is reliably and orderly received by the subscriber entity, but the reliable transmission of the previous data is not ensured, where N is a positive integer;

a best effort form: when the Qos of the soft bus is configured in the best effort form, and it is only ensured by the soft bus that data published by the publisher entity is orderly transmitted to the subscriber entity, but it is not ensured that all data is delivered in entirety.

In this embodiment, the persistence service is specifically as follows:

When data is published by a publisher entity, a subscriber entity corresponding thereto may not be online, and the published historical data is missed when the subscriber entity goes online: when the Qos of the soft bus is configured to be persistent, the data of the publisher entity is stored in a memory or a hard disk by the soft bus, and when the publisher entity is matched with a new subscriber entity, the stored historical data is actively sent by the soft bus to the new subscriber entity.

Under the soft bus QoS service configuration, the QoS of the publisher entity and that of the subscriber entity corresponding thereto need to match. For example, reliability Qos of a subscriber entity on an application 2 is configured in the best effort form, the reliability Qos of a publisher entity matched with the subscriber entity on the application 2 must be also configured in the best effort form, not in a strictly reliable form.

It should be noted that relational terms herein such as first, second and the like are only used to distinguish one entity or operation from another entity or operation without necessarily requiring or implying any actual such relationship or order between such entities or operations. It should be noted that terms "including", "comprising", or any other variants thereof are intended to cover non-exclusive inclusion, such that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in a process, method, article, or device including the elements.

It should be noted that in the description of the present invention, the terms such as "center", "height", "thickness", "above", "below", "vertical", "horizontal", "top", "bottom", "inner", "outer", "axial", "radial", "circumferential" and the like indicate the orientation or position relationships based on the drawings. These terms are merely intended to facilitate description of the present invention and simplify the description, rather than to indicate or imply that the mentioned apparatus or element must have a specific orientation and must be constructed and operated in a specific orientation. Therefore, these terms should not be construed as a limitation to the present invention. In the description of the present invention, "a plurality of" means two or more, unless otherwise specifically defined.

In the description of the present invention, unless otherwise clearly specified, the terms such as "mounting", "interconnection", "connection" and "fixation" are intended to be understood in a broad sense. For example, the "connection" may be a fixed connection, a detachable connection or an integrated connection: a mechanical connection or an electrical connection; or a direct connection, an indirect connection via a medium, or communication or interaction between two elements. A person of ordinary skill in the art may understand specific meanings of the foregoing terms in the present invention based on a specific situation.

In the present invention, unless otherwise expressly specified and limited, a case that a first feature is "on" or "below" a second feature may include that the first and second features are in direct contact or that the first feature is in indirect contact with the second feature through additional features between them. In addition, a case that the first feature is "above", "over" and "on" the second feature includes that the first feature is directly above or obliquely above the second feature or simply indicates that the first feature is horizontally higher the second feature. A case that the first feature is "under", "below" and "underneath" the second feature includes that the first feature is directly below or obliquely below the second feature or simply indicates that the first feature is horizontally lower the second feature.

Although the content of the present invention is described in detail in the foregoing preferred embodiments, it should be known that the foregoing description should not be construed as a limitation on the present invention. Various modifications and alternatives to the present invention are apparent to those skilled in the art upon reading the foregoing. Therefore, the protection scope of the present invention should be defined by the appended claims.

The invention claimed is:

1. A method for implementing a real-time soft bus oriented to an intelligent rail transit system, wherein the intelligent rail transit system comprises at least one professional subsystem, each professional subsystem accesses a soft bus via at least one control center and/or at least one station; a communication front-end processor of each station is configured to interact with a server of the station via different nodes of the soft bus; and a communication front-end processor of the control center is configured to interact with a server of the control center via other nodes of the soft bus; the soft bus includes a soft bus resource interface, a QoS (quality of service) module and a shared memory; the soft bus resource interface includes a transmission plug-in interface, a thread pool container, and an entity creation interface; the method comprising:

defining a data type for interaction between the servers and the communication front-end processors, wherein the data type is a message structure body comprising a message header and a message body; structure information of the message header comprises an interface version number, a message sending time, a data check code, source address information, destination address information, and/or a message type; the source address information comprises a domain number wherein the source address is located and/or a serial number of the communication front-end processor located at the source address; and/or the destination address information comprises a domain number wherein the destination address is located and/or a serial number of the communication front-end processor located at the destination address;

enabling professional subsystems to construct at least one publisher entity and/or at least one subscriber entity respectively on the soft bus via the entity creation interface, where the publisher entity communicates with its corresponding subscriber entity, and the message structure body is a most basic data transmission unit between the publisher entity and its corresponding subscriber entity;

the enabling professional subsystems to construct at least one publisher entity and/or at least one subscriber entity comprises:

registering, by the professional subsystems, entity information to the soft bus when the publisher entity and/or the subscriber entity are/is created on a node of the soft bus; publishing the entity information by the soft bus, and enabling other nodes of the soft bus to perform parameter matching after the entity information is received, recording the entity information by the soft bus and returning match information to the corresponding nodes only after match rules are met;

data isolation of the soft bus is achieved via domains; a domain number is specified when the publisher entity or the subscriber entity is created on a node of the soft bus by the professional subsystems, and a unicast or multicast port is calculated by the soft bus according to the domain number; after the unicast or multicast port is determined, the publisher entity or the subscriber entity on each node send and receive data on the unicast or multicast port;

the domain number is set to d ($0 \leq d \leq 200$); when the publisher entity and the subscriber entity match for communication, the multicast port is calculated in the following formula: port 1=7720+d×250, where the port 1 is the multicast port, and wherein d is the domain number;

after the matching, responsive to determining that the publisher entity and the subscriber entity communicate data, the unicast port is calculated in the following formula: port 2=7720+d×250+hostId×2, where the port 2 is the unicast port, and wherein d is the domain number, and where the hostId is a serial number of the communication front-end processor where the subscriber entity is located; and the multicast port is calculated in the following formula: port 3=7720+d× 250+1, where the port 3 is the multicast port, and wherein d is the domain number.

2. The method for implementing a real-time soft bus oriented to intelligent rail transit system according to claim 1, further comprising:

respectively providing the publisher entity and the subscriber entity with at least one partition, wherein the publisher entity and the subscriber entity communicate with each other only when the partition of the publisher entity and the partition of the subscriber entity intersect.

3. The method for implementing a real-time soft bus oriented to an intelligent rail transit system according to claim 2, wherein the publisher entity and the subscriber entity are respectively associated with at least one subject, and the publisher entity publishes data through its associated subject, and the subscriber entity obtains data of interest through its associated subject.

4. The method for implementing a real-time soft bus oriented to an intelligent rail transit system according to claim 1, wherein the step of enabling professional subsystems to construct at least one publisher entity and/or at least one subscriber entity respectively comprises:

the transmission plug-in interface, which is configured to define a transmission mode of data communication, wherein the transmission mode comprises:

responsive to determining that a publisher entity and a subscriber entity corresponding to the publisher entity are on a same host, the two entities communicate data by sharing a memory; and responsive to determining that a publisher entity and a subscriber entity corresponding to the publisher entity are on different hosts, the two entities communicate data by user datagram protocol unicast or multicast.

5. The method for implementing a real-time soft bus oriented to an intelligent rail transit system according to claim 1, wherein the step of enabling professional subsystems to construct at least one publisher entity and/or at least one subscriber entity respectively comprises:

the thread pool container, which is configured as a management container of the publisher entity and the subscriber entity, wherein a management method of the management container comprises:

when there are the publisher entity and the subscriber entity that are matched, the thread pool container creates, uses, and queries the publisher entity and the subscriber entity that are matched; and when the publisher entity and the subscriber entity that are matched are disconnected, the thread pool container destroys and recycles the publisher entity and the subscriber entity that are unmatched.

6. The method for implementing a real-time soft bus oriented to an intelligent rail transit system according to claim 1, wherein the method comprises:

the QoS module, by whose QoS services any behavior of an object contained in the publisher entity and the subscriber entity is determined; and QoS services of the publisher entity and that of the subscriber entity are the same;

the QoS services comprise:

each packet of data sent by the publisher entity is orderly transmitted to the subscriber entity by the soft bus after the matching of the publisher entity and the subscriber entity is completed;

the last N packet data of the publisher entity is orderly received by the subscriber entity, wherein N is the number of the packet data and N is a positive integer;

data published by the publisher entity is orderly transmitted to the subscriber entity, but it is not ensured that all data is delivered in entirety;

the QoS services further comprise:

when data is published by the publisher entity and the subscriber entity corresponding thereto is not online, the data of the publisher entity is stored in a memory or a hard disk by the soft bus; and when the publisher entity is matched with a new subscriber entity, the stored historical data is actively sent by the soft bus to the new subscriber entity.

7. A real-time soft bus, wherein the soft bus is implemented by the method for implementing a real-time soft bus oriented to an intelligent rail transit system according to claim 1, and the soft bus comprises a soft bus resource interface, a QoS (quality of service) module, a soft bus event driving module and a shared memory, wherein the soft bus resource interface comprises a transmission plug-in interface, a thread pool container, a data cache unit, and an entity creation interface.

* * * * *